(12) United States Patent
Turner et al.

(10) Patent No.: US 7,562,125 B2
(45) Date of Patent: Jul. 14, 2009

(54) TECHNIQUES FOR LOCATING DISTRIBUTED OBJECTS ON A NETWORK BASED ON PHYSICAL COMMUNICATION COSTS

(75) Inventors: Bryan Turner, Cary, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 793 days.

(21) Appl. No.: 11/049,559

(22) Filed: Feb. 2, 2005

(65) Prior Publication Data

US 2006/0173855 A1 Aug. 3, 2006

(51) Int. Cl.
*G06F 15/167* (2006.01)
(52) U.S. Cl. .......................... 709/216; 709/241; 707/10
(58) Field of Classification Search ................. 709/203, 709/216, 219, 241; 707/10
See application file for complete search history.

(56) References Cited

U.S. PATENT DOCUMENTS

| | | | | |
|---|---|---|---|---|
| 4,914,571 | A * | 4/1990 | Baratz et al. ................... | 707/10 |
| 6,327,591 | B1 * | 12/2001 | Osborn et al. ................. | 707/10 |
| 6,484,161 | B1 * | 11/2002 | Chipalkatti et al. ............ | 707/3 |
| 6,665,675 | B1 * | 12/2003 | Mitaru ......................... | 707/10 |
| 7,099,871 | B2 * | 8/2006 | Faybishenko et al. ......... | 707/10 |
| 7,272,613 | B2 * | 9/2007 | Sim et al. ..................... | 707/102 |
| 7,359,985 | B2 * | 4/2008 | Grove et al. ................. | 709/238 |
| 2003/0074403 | A1 * | 4/2003 | Harrow et al. .............. | 709/203 |
| 2004/0148434 | A1 * | 7/2004 | Matsubara et al. .......... | 709/246 |
| 2004/0260701 | A1 * | 12/2004 | Lehikoinen et al. ........... | 707/10 |
| 2005/0015466 | A1 * | 1/2005 | Tripp ........................ | 709/219 |
| 2005/0114350 | A1 * | 5/2005 | Rose et al. .................... | 707/10 |
| 2005/0120073 | A1 * | 6/2005 | Cho ........................... | 709/201 |
| 2005/0216473 | A1 * | 9/2005 | Aoyagi et al. ................. | 707/10 |
| 2006/0168154 | A1 * | 7/2006 | Zhang et al. ................ | 709/220 |
| 2008/0243837 | A1 * | 10/2008 | Davis et al. .................... | 707/5 |

OTHER PUBLICATIONS

Naor, M. and Wieder, U.; Novel Architectures for P2P Applications: the Contmuous-Discrete Approach; SPAA'03 Jun. 7-9, 2003, San Diego, California,.*

Naor, M. and Wieder, U. Novel Architectures for P2P Applications: the Continuous-Discrete Approach, SPAA'03 Jun. 7-9, 2003, San Diego, California,.

(Continued)

*Primary Examiner*—William C Vaughn, Jr.
*Assistant Examiner*—Thomas Richardson
(74) *Attorney, Agent, or Firm*—Stolowitz Ford Cowger LLP

(57) ABSTRACT

Techniques for locating an object such as a data item or service on a node in a distributed system on a computer network include receiving communication cost data that indicates a cost of physically transferring data among nodes in a computer network. A node identifier for a node is determined based on the communication cost data such that a distance between two node identifiers for a pair of nodes is based on a cost of physically transferring data between the pair of nodes. For a particular object that has a particular object identifier, a closest node is determined among the plurality of nodes based on the particular object identifier and node identifiers corresponding to the nodes. The object is located through the closest node, such as by retrieving it or a pointer or an identifier for another node that is still closer to the object.

17 Claims, 5 Drawing Sheets

OTHER PUBLICATIONS

Naor, M. and Wieder, U. A Simple Fault Tolerant Distributed Hash Table, There is no information on the publisher or year of the publication.

Balakrishnan, H, et al., Looking Up Data in P2P Systems, There is no information on the publisher or year of the publication.

* cited by examiner

TECHNIQUES FOR LOCATING DISTRIBUTED OBJECTS ON A NETWORK BASED ON PHYSICAL COMMUNICATION COSTS

BACKGROUND OF THE INVENTION

1. Field of the Invention

The present invention relates to locating distributed objects, such as distributed data objects and distributed services, on a computer network; and, in particular, to techniques for locating distributed objects based on physical communication costs, which techniques scale up to networks with a large number of nodes including complex, non-heterogeneous interconnectivity characteristics.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links. An "end node" is a node that is configured to originate or terminate communications over the network. An "intermediate network node" facilitates the passage of data between end nodes.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. Network nodes are often hosts for client and server processes. The term "server" is conventionally used to refer to the process that provides the service, or the host computer on which the process that provides the service operates. Similarly, the term "client" is conventionally used to refer to the process that makes the request, or the host computer on which the process that makes the request operates. As used herein, the terms "client" and "server" refer to the processes, rather than the host computers, unless otherwise clear from the context. In addition, the server process can be broken up to run as multiple processes on multiple hosts (sometimes called tiers) for reasons that include reliability, scalability, and redundancy, but not limited to those reasons.

Distributed systems make data and services available over the network by providing different data items or services, or different instances of data items or services, at different nodes of the network. The data items or services, or both, available from a distributed system are called distributed objects. Distributed systems, such as distributed databases and distributed web page servers, are widely known and used in commerce. An aspect of accessing a requested object is locating the node on which the object resides, also called performing "distributed object location."

As distributed systems and the networks on which they reside continue to grow in size and number of nodes, it becomes more challenging to responsively locate and provide access to the distributed objects, and ever-greater network resources can be consumed doing so. In large distributed systems, with thousands of nodes and hundreds of millions of distributed objects, the resources consumed to track down an object can dwarf the resources consumed to perform the operation using the object.

Various approaches to distributed object location are not scalable to large numbers of nodes. For example, in the approach used by Object Management Group's Common Object Request Broker Architecture (CORBA) and some other distributed systems, a distributed object is bound to a handle that includes an Internet Protocol (IP) address of a server that processes requests for the object. This approach is not scalable because every node in the distributed system is required to store information about every distributed object. Thus, in large distributed systems, each of thousands of nodes stores information about hundreds of millions of data objects. Furthermore, every node that wishes to deal with the object must deal with it through its assigned IP address, making the system sensitive to hardware or connectivity failures that make it impossible to connect to that address, and possibly overwhelming the assigned node's processing capability or network connection.

In a more recent approach, distributed hash tables (DHTs) are used for distributing objects in peer to peer (P2P) systems. P2P systems are characterized by multiple servers of equal rank, without a centralized authority for making decisions about the distribution of objects. DHTs do not require distribution of all distributed object information. Instead DHTs map object identifiers to node identifiers using a known mapping and hash function. Hash functions are well known in the art. A variety of DHT systems are described, for example, in Balakrishnan, H., M. Kaashoek, D. Karger, R. Morris, I. Stoica, "Looking Up Data in P2P Systems," 5 pp, 2003, published as a document *cacm*03.*pdf* in directory /~istoica/ *papers*/2003/ at domain cs.berkeley.edu on the World Wide Web (www), hereinafter Balakrishnan, the entire contents of which are hereby incorporated by reference as if fully set forth herein. DHTs rely on a recursive look-up process in which each node keeps information about a subset of the distributed objects that map to that node. Requests for other objects are sent to the node with the node identifier produced by the mapping. The recursive lookup process scales logarithmically (i.e., lookup overhead increases with the logarithm of the number of nodes), or better as the number of nodes in the network increase.

Improvements in the distribution of objects' identifiers among node identifiers, which more evenly spread the load and more easily recover from node removal and node joins, have been proposed. For example, in one approach, a continuous identifier region (Voronoi cell) is centered on discrete node identifiers (generators on a Voroni graph). All object identifiers that map into the region around the node identifier are assigned to the node with that identifier. The continuous identifier space can be one dimensional or multi-dimensional, with the number of dimensions designated by the letter "d." This approach is called the continuous-discrete approach and is described in Naor, M. and U. Wieder, "Novel Architectures for P2P Applications: the Continuous-Discrete Approach," 10 pp, 2003, published as a document *dh.pdf* in directory /~naor/PAPERS/ at domain wisdom.weizmann.ac.il on the World Wide Web (www), hereinafter Naor I; and in Naor, M. and U. Wieder, "A Simple Fault-Tolerant Distributed Hash Table," 6 pp, 2003, published as a document simple_fault_tolerant.pdf in directory /final-papers/2003/ at domain iptps03.cs.berkeley.edu on the Internet, hereinafter Naor II; the entire contents of both of which are hereby incorporated by reference as if fully set forth herein.

While suitable for many purposes, DHTs and continuous-discrete DHTs still suffer some disadvantages. In particular, these DHTs associate objects with nodes without regard to the physical cost, in terms of time and network resource utilization, of transferring data between nodes. Once the IP address of the service is retrieved, after the mapping, additional communication relies on the shortest path first (SPF) routing method implemented in an underlying network, outside the control of the DHT approach. Essentially, these approaches assume the SPF routing accomplishes all transfers with an equal average cost. Problems that arise because of ignorance about the physical structure and state of the network include excessive cross-core routing, denial of data existence, rejoin problems, flapping and stabilization complexities.

In cross-core routing, a lookup request for a certain object sometimes bounces back and forth across a potentially congested wide area network (WAN) link. If both the requester and the data are on the same local area network (LAN), this excess traffic on the congested link is a misuse of the limited resources on that link. This problem is exacerbated when objects are replicated and the replicating node is on a remote LAN while most of the using nodes are on the same LAN as the owning node.

As an example of the denial of existence problem, if a node is unavailable for communications, even for a short time, ownership of the node's objects is transferred to another node that does not actually have the objects. Thus the objects located at the original node can no longer be found by the DHT systems and are assumed to be non-existent. Clients, servers, and other computer application processes that just created the object are often unable to cope gracefully with a system that subsequently denies the existence of the object. For example, an application that just stored some data as a data object and "knows" the data exists might not be programmed to deal with a system response that denies the existence of the data object. Such a program might sit idly, doing nothing, while it waits to retrieve its data.

As an example of the rejoin problem, consider what happens in the above case when the node with the lost objects rejoins the network. Then ownership of the lost objects must be transferred eventually back to the rejoining node in a complex and resource consuming process.

Flapping occurs when a node is repeatedly removed and rejoined to a network. This can occur even when the node is persistently linked to the network. For example, congestion on a link, or static at a modem, causes messages to be dropped. If some of the messages are "Keep Alive" messages in which nodes of the distributed system announce their availability, one or more other nodes might infer that a node whose messages are dropped is dead. In response, the other nodes send more messages to reassign ownership of the objects originally owned by the "dead" node. This further congests the link and causes more nodes to be inferred as "dead." When traffic subsides and "Keep Alive" messages are not dropped, more resources are consumed in rejoining the formerly "dead" node. The repeated dying and rejoining of actually connected nodes is called flapping. To reduce flapping, some stabilization measures can be taken, but such measures increase the complexity of the system.

Based on the foregoing description, there is a clear need for techniques to locate distributed objects on a network, which techniques do not suffer the deficiencies of prior art approaches. In particular there is a clear need for techniques to locate distributed objects that scale to networks with a large number of nodes and/or heterogeneous connectivity between nodes. Furthermore, there is a need for techniques to distinguish between a non-existent distributed object and a distributed object that is found at a node that is temporarily unavailable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for locating distributed objects on a network based on physical communication costs. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Techniques are provided to locate distributed objects on a network based on physical communication costs.

Embodiments of the invention are described in the context of enterprise class networks; but the invention is not limited to these contexts. Enterprise networks include broadband links, intermediate network nodes that can be programmed to provide the information used in the illustrated embodiments, and a trusted administrative domain that directs the joining and removal of nodes and protects against malicious attacks by rogue nodes. In other embodiments, the methods are used in other networks. For example, in some embodiments other approaches are employed to ensure security so that the nodes operate in the manner prescribed. In some embodiments, one or more narrowband links connect one or more local area networks under different administrative control. In some embodiments, directed joins and removals are not employed and ownership of objects is transferred gradually or immediately upon the disconnection of a node. In some embodiments, connection cost data may be acquired on an ad hoc basis by observing connection throughput, or by parameters input by an operator.

1.0 Network Node Identifiers for Object Location

Figure 1:
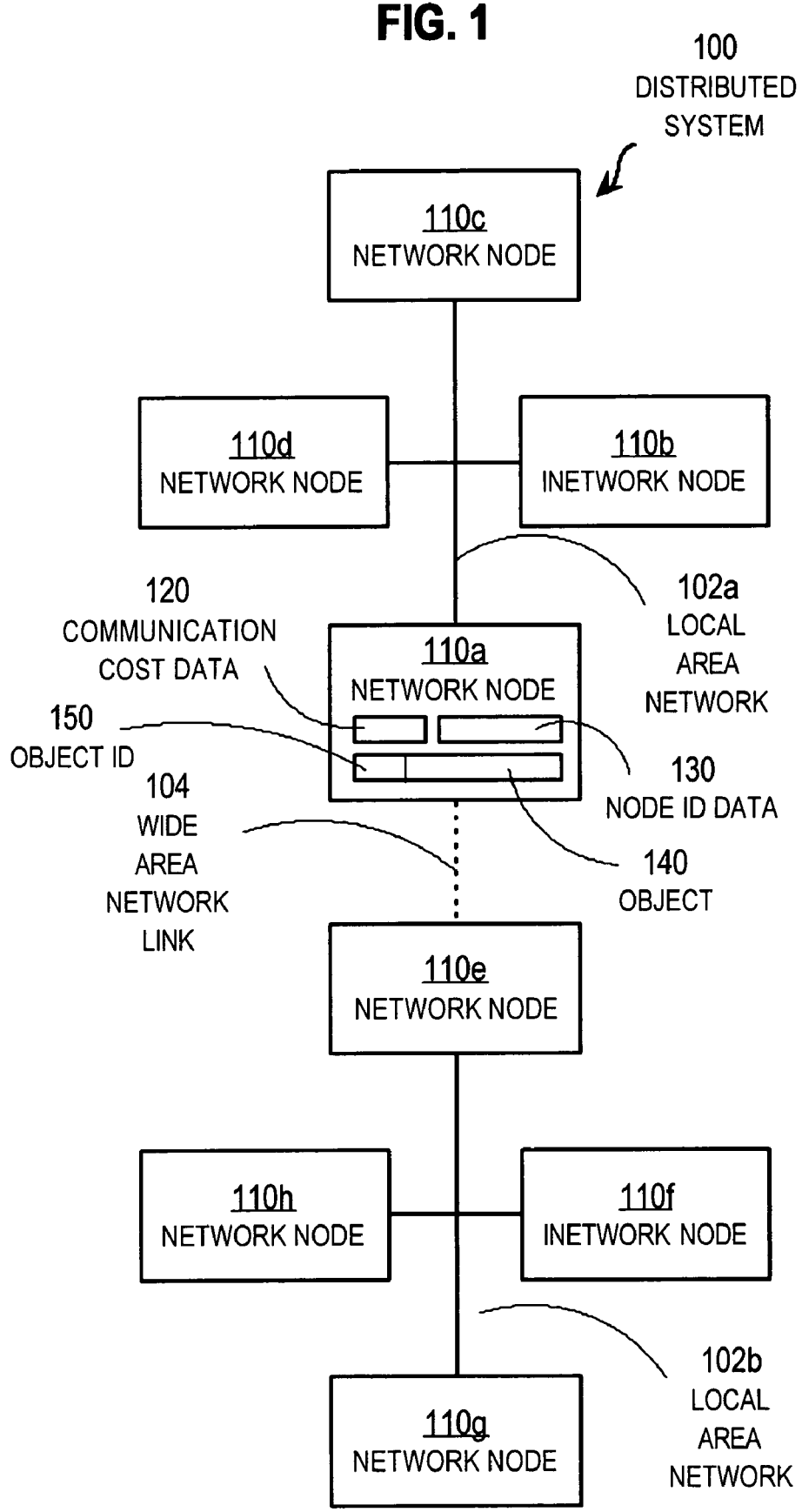
FIG. 1 is a block diagram that illustrates a distributed system, according to an embodiment.

FIG. 1 is a block diagram that illustrates a distributed system 100, according to an embodiment. The system 100 includes network nodes 110a, 110b, 110c, 110d, 110e, 110f, 110g, 110h (collectively referenced hereinafter as nodes 110). Nodes 110a, 110b, 110c, 110d are physically connected to each other over local area network (LAN) 102a. Nodes 110e, 110f, 110g, 110h are connected to each other over LAN 102b. Nodes 110a and 110e are also connected to each other over wide area network (WAN) link 104. For the purposes of illustration, FIG. 1 includes eight nodes 110 connected on two LANs 102a, 102b and one WAN link 104. In other embodiments more or fewer nodes are connected over more or fewer LANs and more or fewer WAN links on more or fewer WANs. In an example embodiment, distributed system 100 operates on an enterprise network with a virtual private network WAN link 104 connecting secure LANs 102a, 102b.

According to the illustrated embodiment, nodes 110 include network communication cost data, network node identifier (node ID) data, and distributed object data with distributed object identifiers (object IDs). For example, node 110a includes communication cost data 120, node ID data 130, and a distributed object data 140 associated with object ID 150. Node 110a also includes data and object IDs for many other distributed objects (not shown).

One or more servers or clients (not shown) operate on each of one or more network nodes 110 to generate or process requests of distributed system 100. One or more distributed objects are located on each node 110. An object is located at a node if the data or service for that object is provided by a server at the node, or a pointer is provided at the node to a server on a different node where the data or service can be obtained. For example object 140 associated with object ID 150 is located on network node 110a.

In the distributed system 100, a protocol implemented by clients and servers on nodes 110 determines which objects are located at which nodes. In an illustrated embodiment, a continuous-discrete mapping between object IDs (e.g., object ID 150) and node IDs (e.g., node ID for node 110a stored in node ID data 130) is used to associate a particular distributed object (e.g., object 140) with a particular node (e.g., node 110a).

Figure 2:
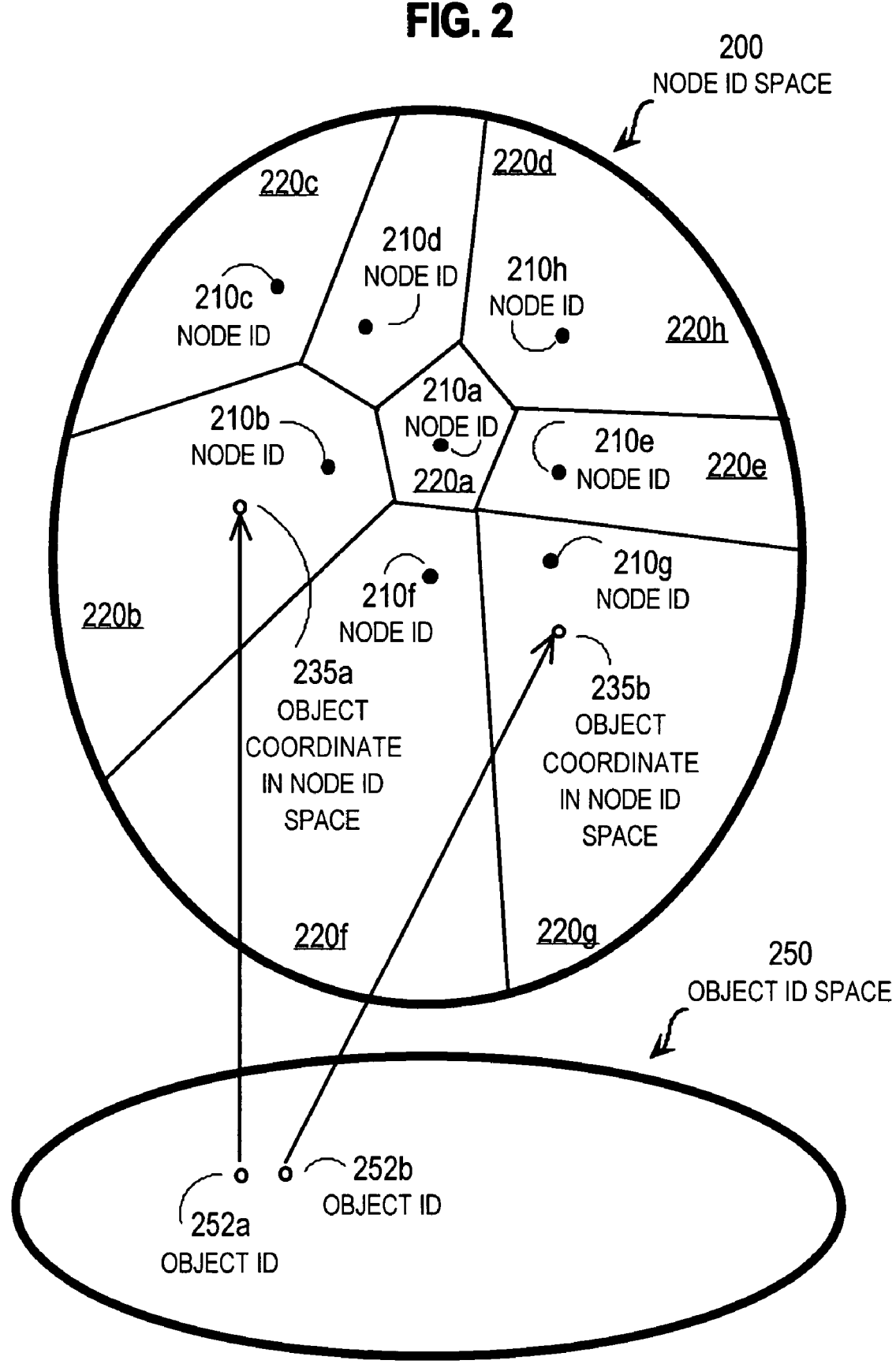
FIG. 2 is a block diagram that illustrates a node identifier space and an object identifier space, according to an embodiment.

FIG. 2 is a block diagram that illustrates a node ID space 200 and an object ID space 250, according to an embodiment using continuous-discrete mapping. Each node has a node ID that corresponds to a discrete position in node ID space. The node ID space can have any number of dimensions d. A node ID in a d-dimension space is expressed by d coordinates. In the illustrated embodiment, the node ID space 200 is a three dimensional volume of an ellipsoid. A node ID is a point in this volume as expressed by three coordinates, such as 3 Cartesian coordinates (distance along three perpendicular axes) or 3 polar coordinates (distance from a center point and direction expressed as an angle in each of two perpendicular planes).

In the illustrated embodiment, nodes 110a, 110b, 110c, 110d, 110e, 110f, 110g, 110h have node IDs 210a, 210b, 210c, 210d, 210e, 210f, 210g, 210h, respectively (collectively referenced hereinafter as node IDs 210) in node ID space 200.

Each distributed object has an object ID that corresponds to a discrete position in object ID space. The object ID space can have any number of dimensions d, and can be the same space or a different space from the node ID space with the same or a different dimensionality d, as long as a mapping exists to compute the distance from an object ID in object space to a node ID in node space. In the illustrated embodiment, the object ID space 250 is a two dimensional area of an ellipse. An object ID is a point in this area as expressed by two coordinates, such as 2 Cartesian coordinates (distance along two perpendicular axes) or 2 polar coordinates (distance from a center point and direction expressed as an angle in the plane of the ellipse). For example, two objects have the two object IDs 252a, 252b, (collectively referenced hereinafter as object IDs 252) in object ID space 250.

If the node ID space 200 is different from the object ID space 250, as illustrated, a mapping projects each object ID 252 into a position in the node ID space 200. Such a mapping is illustrated in FIG. 2 by the arrows connecting points 252 in object ID space 250 to corresponding points 235a, 235b in node ID space. These corresponding points 235a, 235b are called herein object coordinates in node ID space (collectively referenced hereinafter as object coordinates 235). For example, three hash functions are used on the two coordinates of object IDs 252a, 252b to generate three coordinates of the object in node ID space 235a, 235b, respectively.

As taught by Noar I, cited above, a preferred node 110 for locating an object is a node that has a node ID 210 that is closest to the object coordinates 235 in node ID space 200 of an object with object ID 252 in object ID space 250.

In the illustrated embodiment, the node ID space 200 is divided into different regions 220a, 220b, 220c, 220d, 220e, 220f, 220g, 220h (collectively referenced hereinafter as regions 220), corresponding to node IDs 210a, 210b, 210c, 210d, 210e, 210f, 210g, 210h, respectively. The locus of points that make up each region 220 are closer to the corresponding node ID 210 than to a different node ID 210. Thus an object ID 252 that maps into a region 220 is preferably located at the node that has the corresponding node ID 210. For example, object ID 252a maps to coordinates 235a in region 220b; therefore the object with object ID 252a is located at the node 110b with node ID 210b. Similarly, object ID 252b maps to coordinates 235b in region 220h; therefore the object with object ID 252b is located at the node 110 h with node ID 210h.

According to a set of embodiments of the invention, node IDs 210 are assigned in node ID space 200 such that their separation in ID space 200 is based on the cost of transferring data between them over the physical network of distributed system 100. A method for determining and using node IDs with separations based on the cost of physically transferring data between them according to an illustrated embodiment is described in the next section with reference to FIG. 3 and FIG. 4.

2.0 Method for Using Network Cost Sensitive Node Identifiers

Figure 3:
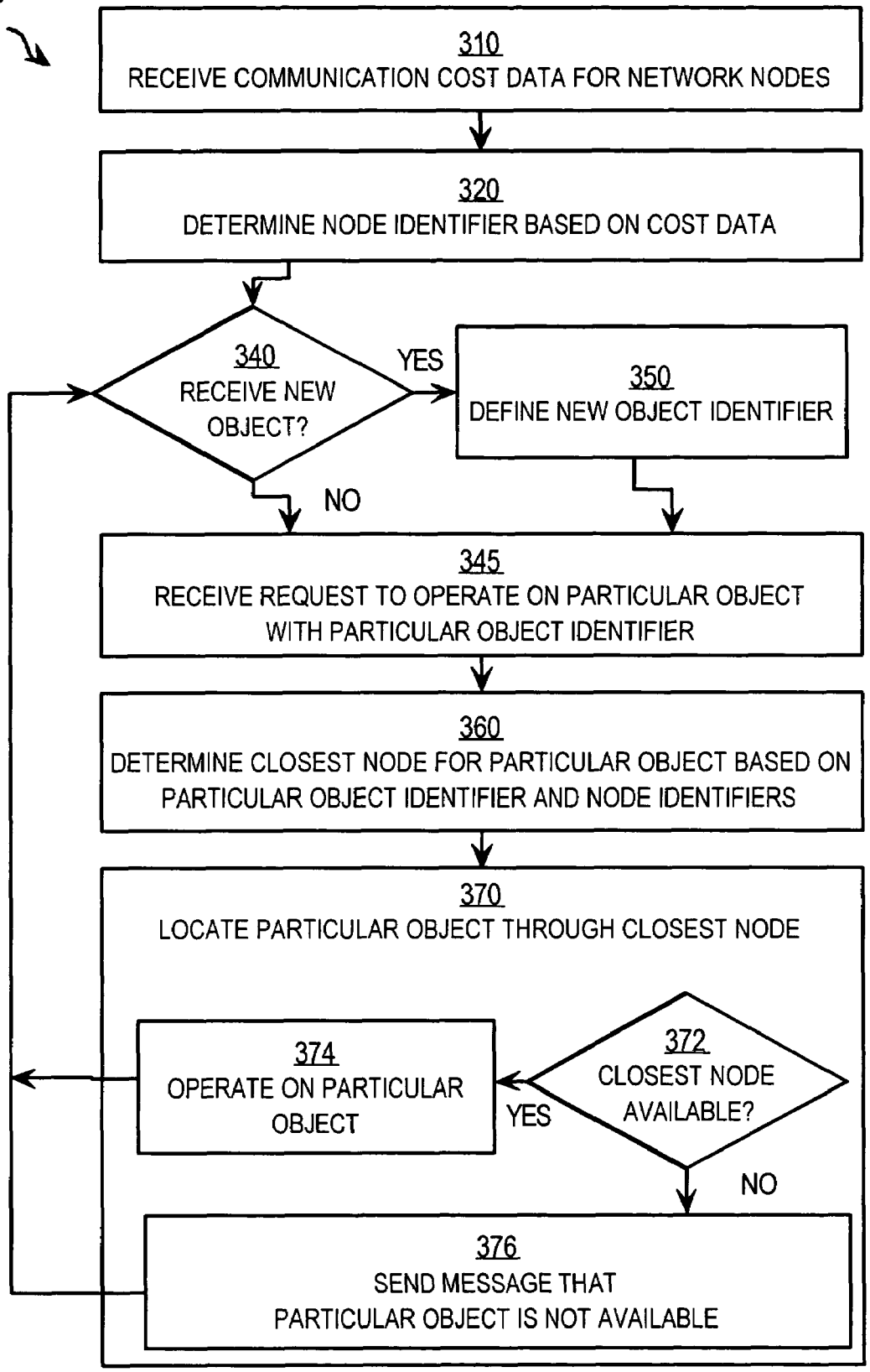
FIG. 3 is a flow diagram that illustrates at a high level a method for locating an object in a distributed system, according to an embodiment.

FIG. 3 is a flow diagram that illustrates at a high level a method for locating an object in a distributed system, according to an embodiment. Although steps are shown in FIG. 3 and subsequent flow diagrams in a particular order for purposes of illustration, in other embodiments one or more steps are performed in a different order or overlapping in time or are omitted or are changed in some combination of ways.

In step 310, a node receives communication cost data for one or more network nodes. In an illustrated example of step 310, when a node joins a network, the joining node receives data that indicates a set of neighbor nodes to which the joining node is directly connected. This communication cost data can be received in any manner known in the art.

In some embodiments, step 310 includes determining that the joining network node 110d is connected to network node 110e by two hops through node 110a, and by three hops to nodes 110f, 110g, 110h through nodes 110a and 110e. In some embodiments, step 310 includes determining that the joining network node 110d is connected to node 110e through a WAN link 104 that is characterized by certain values for one or more network routing metrics. A large number of network routing metrics are widely known and used, such as path length, reliability, routing delay, bandwidth, load and utilization cost.

In some embodiments, step 310 includes receiving distributed system node IDs of the nodes for which the cost data is received.

Figure 4:
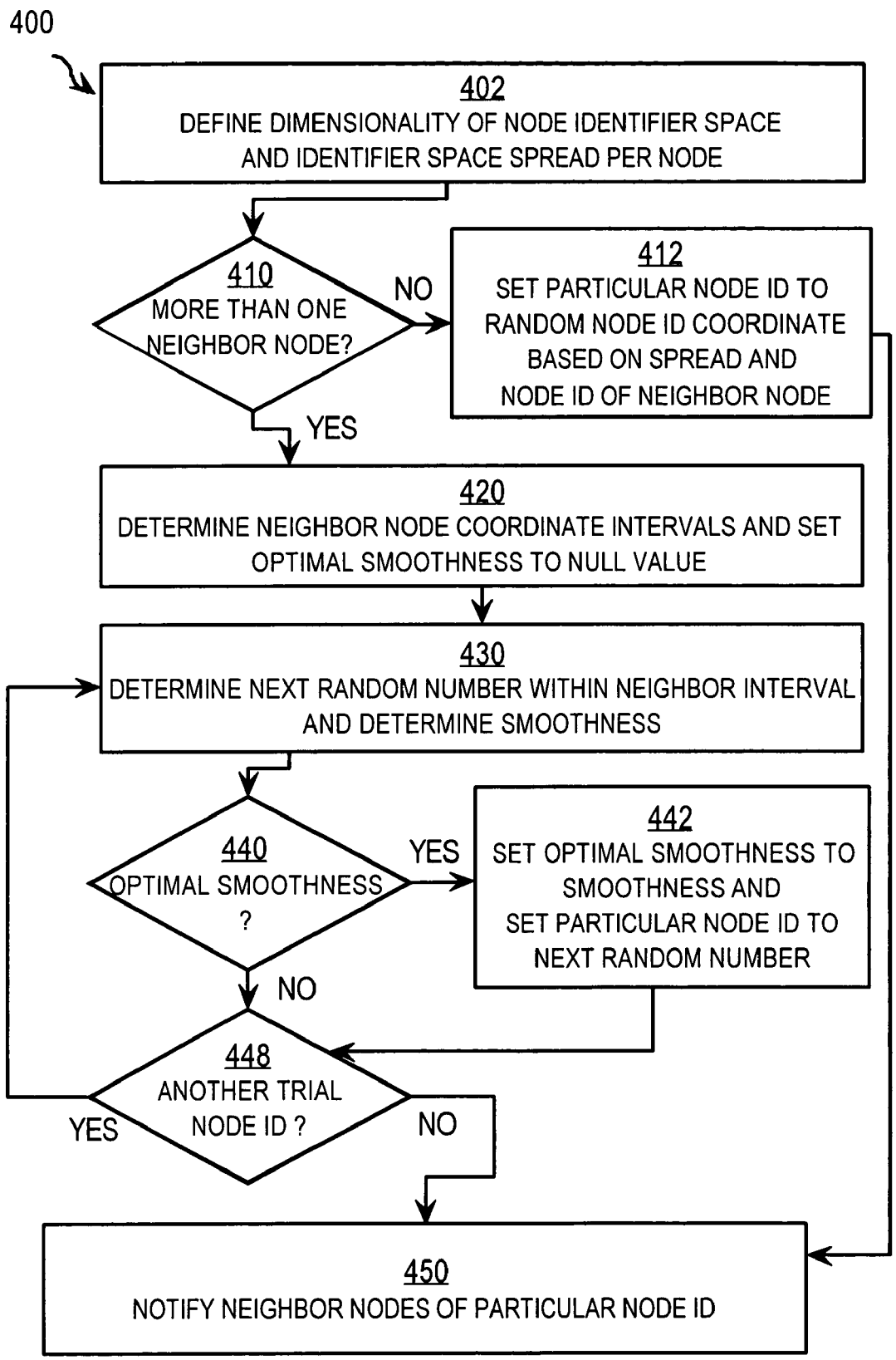
FIG. 4 is a flow diagram that illustrates in more detail the step shown in FIG. 3 for determining node identifiers based on communication cost data, according to an embodiment.

In step 320, a node ID is determined for the joining node based on the cost data. FIG. 4 is a flow diagram that illustrates step 320 for determining node identifiers based on communication cost data, according to a more detailed embodiment 400.

In step 402, a dimensionality d for the node ID space is defined, and the amount of node ID space to be covered by each node is also defined as a spread scale. In some embodiments, step 402 is performed before step 310. In some embodiments, the dimensionality is one. In some embodiments a spread scale is not defined.

In an illustrated embodiment, the dimensionality d is three, i.e., the node ID space is three dimensional and each node ID has three Cartesian coordinates.

Any method may be used to determine a spread scale. In the illustrated embodiment, the node ID space 200 has a total volume given by the volume of the ellipsoid, which depends on a major axis along the longest dimension of the ellipse and the minor axis along its shortest dimension and the dimension of the axis perpendicular to the axis of rotation. It is assumed for purposes of illustration that the ellipsoid is rotated about the major axis. If the volume of the ellipse is to be covered, eventually, by thousands of nodes, each node is expected to cover about a thousandth of the volume. The node ID space can be covered by a thousand nodes if each node, on average, covers a volume region of about one tenth the major axis by one tenth the minor axis by one tenth the minor axis. In the illustrated embodiment, the diameter of node ID space for each node is therefore selected to be about one tenth the major axis of the node ID space 200. It is assumed for purposes of illustration that the major axis has a length of 10000 units and the minor axis has a length of 9000 units so that unique coordinates can be given to billions of distributed objects. It is further assumed for purposes of illustration that an average diameter per node is defined to be 1000 units and a spread scale is defined to be 500 units, so each node can locate millions of distributed objects.

In step 410, it is determined whether the joining node has more than one neighbor. In the illustrated embodiment, a set of neighbors for the joining node are determined during step 310 described above. In general, a joining node will have more than one neighbor, especially in a large distributed system with thousands of nodes. However, in the early stages of forming the network for a distributed system a joining node may have only one neighbor, and of course the first node has no neighbor.

If it is determined in step 410 that the joining node does not have more than one neighbor, control passes to step 412. In step 412 a node ID for the joining node is determined by selecting a random point (coordinate set) in the node identifier space made up of a different random number for each coordinate. If there is no neighbor, the node ID is selected at random within the node ID space. If there is one neighbor, the node ID for the joining node is determined by selecting a random number for each coordinate in an interval spaced from the neighbor node by an amount based on the spread. The spacing may also depend on a metric of the cost of transferring data to the neighbor.

For purposes of illustration, it is assumed that the random number is selected for each coordinate in a range from zero to two times the spread from the neighbor for a direct, high speed, highly reliable connection, such as a LAN connection. It is further assumed that the random number is selected for each coordinate in a range from one-half to four times the spread for a low bandwidth, low speed, and congested connection, such as WAN link 104. It is further assumed that node 110a is the first node in the distributed system followed by the other nodes 110 in alphabetical order. Thus the distributed system server executing on node 110a selects three coordinates at random in the node ID space during step 412. For purposes of illustration, it is assumed that the server on node 110a selects the coordinates (1000, 8000, 5000). During step 412, the distributed system server on the second node 110b connected over LAN 102a selects three coordinates at random between zero and 2*500 units from the three coordinates for its only neighbor 110a. When the node 110b attempts to join, as described above during step 310, it receives data that indicates that it has one neighbor, node 110a, and that the node ID for node 110a is (1000, 8000, 5000). For purposes of illustration, it is assumed that the distributed system server on node 110b selects the coordinates (700, 7600, 5800).

It is further assumed, for purposes of illustration that during step 412, the distributed system server on the node 110e connected over WAN link 104 selects three coordinates at random between ½*500 units and 4*500 units from the three coordinates for its only neighbor 110a. For purposes of illustration, it is assumed that the distributed system server on node 110e selects the coordinates (2500, 7500, 4000).

From step 412, control passes to step 450. In step 450, the server notifies its neighbors of the node ID it has selected. For example, during step 450, the distributed system server on node 110b notifies the distributed system server on node 110a that the node ID for node 110b is (700, 7600, 5800). Similarly, the distributed system server on node 110e notifies the distributed system server on node 110a that the node ID for node 110e is (2500, 7500, 4000).

If it is determined in step 410 that the joining node has more than one neighbor, control passes to step 420. In step 420, the coordinate intervals for all the nodes in the neighbor set are determined. If the symbol G represents the set of node IDs for the neighbors, then step 420 determines a neighbor ID interval [MIN(G), MAX(G)] in d dimensional node ID space. The neighbor ID interval includes coordinate intervals for the nodes in the neighbor set range from the smallest to the largest coordinate values among the set of neighbors for each dimension. For example, when node 110c joins the distributed system, it has two neighbors, 110a, 110b, so control passes to step 420. In step 420 the neighbor ID interval is given by the coordinate intervals for the three coordinates of the set of neighbor nodes, which are the three ranges: 700 to 1000 for the first coordinate; 7600 to 8000 for the second coordinate; and 5000 to 5800 for the third coordinate.

In the illustrated embodiment, a smoothness parameter is set to a null value (that indicates no smoothness) during step 420. The smoothness is used to prevent determining a node ID that is too close to existing node IDs, as described in more detail below. In some embodiments, the smoothness is not used.

In step 430, a random number is determined within the neighbor's coordinate intervals for each of the coordinates, i.e., within the neighbor ID interval [MIN(G), MAX(G)]. For example, a distributed system server on node 110c determines, within the three coordinate intervals, a set of three random numbers (710, 7615, 5765) which may be used to define a node ID for node 110c.

In the illustrated embodiment, the smoothness of the set of node IDs including the neighbors and the newly generated random coordinates is determined to measure whether the new coordinates are too close to one or more of the existing neighbor node IDs. A smoothness parameter, $\rho$, defined in Noar I, is used in some embodiments. The smoothness $\rho$ is defined in Noar I as the ratio of a size of a largest Voronoi cell to a size of a smallest Voronoi cell in the Voronoi graph of dimention d where nodes 210 represent Voronoi generators. An optimal value of ρ is 1.0. In some embodiments, a measure of smoothness is simply a distance between the new coordinates and the closest neighbor, e.g., the smallest distance between the new coordinates and any of the neighbors. Larger values of are optimal. Any distance measure may be used. In the illustrated embodiment a Euclidean distance is used. For example, the Euclidean distance from the new coordinate (710, 7615, 5785) to node 110a is 904 and the distance to node 110b is 39 (rounded to the nearest whole value). Therefore, the distance to the closest neighbor, is 39.

In step 440, it is determined whether the value of the smoothness parameter is acceptable (more optimal in some sense). If so, control passes to step 442. If not, control passes to step 448. On the first pass, the value of the smoothness parameter is null, which is never acceptable, so control passes to step 442. The definition of acceptable smoothness is left to the implementation.

In step 442, the smoothness parameter is reset to the new value of smoothness and the node ID for the joining node is set to the new coordinates. In the illustrated embodiment, the value of the smoothness parameter is set to 39 and the node ID for node 110c is set to (710, 7615, 5785) on the first pass. Control then passes to step 448.

In step 448, it is determined whether there is another node ID to try that might yield more optimal smoothness. If not, control passes to step 450 to notify neighbor nodes of the node ID for the joining node.

It is assumed for purposes of illustration that another node ID is to be tried, and control passes back to step 430 to determine another random point within the neighbor ID interval. It is further assumed for purposes of illustration that the next random number yields a second new node ID (750, 7600, 5100). Therefore the Euclidean distance to node 110a is 482 and the distance to node 110b is 702. The smoothness value is set to 482. It is noted that the Euclidean distance between neighbor nodes 110a, 110b is the same in all passes and does not determine which new coordinate is used.

In step 440, it is determined whether the smoothness of the potential new node ID is better than that of the current best node ID. Smoothness is acceptable (more optimal in a sense) if ρ is closer to one or if is greater than on previous passes. In the illustrated embodiment, has improved during the second pass compared to the first pass because the closest distance 482 is greater than 39. Therefore control passes to step 442 to reset the value of the smoothness parameter to 482 and the node ID for node 110c is set to (750, 7600, 5100) on the second pass. Control then passes to step 448.

It is assumed for purposes of illustration that another node ID is not to be tried, and control passes to step 450 to notify its neighbors that node 110c has the node ID (750, 7600, 5100). In some embodiments, a set number of random node IDs will be tried and the node ID with the best smoothness value will end up being used.

It is further assumed for purposes of illustration that the remaining nodes 110d, 110e, 110f, 110g, 110h join the network in that order and obtain the node IDs shown in Table 1, following the steps of method 400. Also listed in the third column of Table 1 are the Euclidean distances from the node IDs of each node to the node ID of node 110a. As can be seen in Table 1, in terms of their node IDs, the nodes on LAN 102a are closer to node 110a (482 to 943 units) than are the nodes on LAN 102b (1315 to 1871 units). Also listed in the fourth column of Table 1 are the Euclidean distances from the node IDs of each node to the node ID of node 110e. Again, in terms of their node IDs, the nodes on LAN 102b are closer to node 110e (594 to 1049 units) than are the nodes on LAN 102a (1871 to 2548 units). Thus, unlike prior approaches, these node IDs reflect the communication cost of physically transferring data over the network of the distributed system 100.

TABLE 1

Example 3-dimensional node IDs for example distributed system

| Node | Node ID | distance to 110a | distance to 110e |
|---|---|---|---|
| 110a | (1000, 8000, 5000) | 0 | 1871 |
| 110b | (700, 7600, 5800) | 943 | 2548 |
| 110c | (750, 7600, 5100) | 482 | 2069 |
| 110d | (900, 7900, 5700) | 714 | 2369 |
| 110e | (2500, 7500, 4000) | 1871 | 0 |
| 110f | (2000, 6900, 4700) | 1517 | 1049 |
| 110g | (2250, 7000, 4200) | 1790 | 594 |
| 110h | (2100, 7400, 4600) | 1315 | 728 |

In some embodiments, the node ID of each node is distributed only to a subset of the complete set of nodes. For example, in an illustrated embodiment, the node ID of each node is distributed to all nodes to which that node is directly connected, and to all nodes whose rejoins 210 are adjacent to the region of that node. In some embodiments, the node IDs of all the nodes in the distributed system are communicated to all the other nodes and stored at each node in the node ID data 130, as depicted in FIG. 1. This completes step 320 according to one embodiment. Control then passes to step 340, as depicted in FIG. 3.

In step 340, it is determined whether data is received indicating a new object without an object identifier. If not, control passes to step 345. If so, control passes to step 350.

In step 350 a new object ID is determined for the new object. In one embodiment, the object ID is determined in order that the object is located by a node most likely to use the object. For example, in some embodiments, a function H is defined which, when provided with distributed system specific parameters of the object to be inserted, produces a node coordinate and radius that defines a neighborhood where the object is most likely to be requested. For example, if it is determined that the object is most likely to be used on LAN 102a, then the function H produces a coordinate and spread centered on the node IDs of the nodes 110a, 110b, 110c, 110d in LAN 102a, e.g., H produces coordinate set (850, 7800, 5400) and radius 200 units. The object is given an object ID that maps to node ID space coordinates within this neighborhood.

In some embodiments, in the absence of distributed system specific input, the function H produces the coordinates of the node ID for the node that produced the object and a radius based on a spread parameter that is configured by a distributed system administrator. For example, a radius is set equal to half the spread parameter of 500 units for directly connected nodes on a high bandwidth LAN, as described above. For example, if node 110b produces an object for the distributed system, and other distributed system specific information is lacking, the function H produces the coordinates of node 110b and a radius equal to 250 units. Thus, function H produces a neighborhood centered at (700, 7600, 5800) with a radius of 250 units. An object ID is then selected that maps into this neighborhood. For example, an object ID 252a is selected that maps to coordinates 235a (631, 7755, 5853) in this neighborhood, which is a Euclidean distance of 178 units from the node ID of node 110b, as desired. The object then is likely to be located at node 110b, where it is most likely to be used.

It is assumed for purposes of illustration that object ID space 250 is a two dimensional space in which a first coordinate ranges from 0 to 999989 and a second coordinate ranges from 0 to 999000. In practice, most coordinate ranges will extend to a power of 2. It is further assumed for simplicity in illustrating the mapping, that object IDs map to node ID space by taking the digits above the tens place of the first coordinate as the first coordinate of the node ID space. The least significant two digits of the first coordinate and the digits above the thousands place of the second coordinate are concatenated to provide the second coordinate in node ID space. The least significant four digits of the second coordinate represent the third coordinate in node ID space. Thus the object ID (987654, 321098) maps to the node ID (9876, 5432, 1098). The object ID that maps to the node ID coordinates 235a (631, 7755, 5853) then is easily determined to be (063177, 555853)

In the illustrated embodiment, control then passes to step 345. In step 345, a request is received to operate on a particular object with a particular object ID. For example, a request to store object ID 235a (063177, 555853) produced by a distributed system client at node 110b is received at the distributed system server on node 110a.

In step 360, it is determined which is the closest node for the object with the particular object ID based on the object ID and the node IDs stored in the node ID data 130 at node 110a. Any function that maps an object ID to a distance from a node ID can be used. In the illustrated embodiment, the distance function includes mapping the object ID to node ID space and then computing a Euclidean distance between the mapped coordinates and the node ID. For example, object ID 252a (063177, 555853) is mapped to node ID coordinates (0631, 7755, 5853) and the distances are computed to all node IDs stored in the node ID data 130. Table 2 shows the distances computed to the nodes for the particular object.

TABLE 2

Example distances from nodes to a particular object

| Node | Node ID | distance to object having object ID (063177, 555853) which maps to node ID coordinates (0631, 7755, 5853) |
|---|---|---|
| 110a | (1000, 8000, 5000) | 961 |
| 110b | (700, 7600, 5800) | 178 |
| 110c | (750, 7600, 5100) | 778 |
| 110d | (900, 7900, 5700) | 342 |
| 110e | (2500, 7500, 4000) | 2644 |
| 110f | (2000, 6900, 4700) | 1984 |
| 110g | (2250, 7000, 4200) | 2434 |
| 110h | (2100, 7400, 4600) | 1963 |

As can be seen, node 110b is closest to this particular object. Thus, in this example, it is determined in step 360 that node 110b is the closest node. In the illustrated embodiment, the closest node owns the particular object and is responsible for processing requests for that object.

In the illustrated embodiment, only the node IDs of directly connected nodes and nodes with adjacent regions 210 and the node itself are stored in the node ID data 130, and only distances to these nodes are computed. In these embodiments, a given node's node ID data include any node whose portion of the d-dimensional node space is adjacent to the node's portion of node space (as determined by the Voronoi graph), not just nodes that are directly connected to the node via the LAN. In the case which the owning node is not a neighbor of the given node, the node forwards the request to the node in its list that is closest to the object. Such forwarding may need to occur more than once to eventually locate the object authoritatively. For example, referring to FIG. 2, the nodes in the node ID data stored at node 110h include not only directly connected nodes 110e, 110f, 110g, but also node 110a and node 110d whose regions 210a, 210d are adjacent to the region 210h of node 110h. Thus, if the request for object with object ID (063177, 555853) were received at node 110h, the distributed system server on node 110h would determine that node 110d is closer to the mapped coordinates of the object ID, and would forward the request to node 110d. The distributed system server on node 110d would then determine that an even closer node is node 110b, and forward the request to node 110b.

In some embodiments, step 360 includes determining whether the particular object can be located at the local node that received the request, even though the object is owned by another node that has primary responsibility for the object. For example, in some embodiments, a distributed system server on the local node receives a request to retrieve a data object. The server on the local node examines its local store to determine whether the object is located there and the local copy is up-to-date, as might occur, for example, in a system with data replication. If so, the server on the local node satisfies the request for the data object. If not, the server on the local node examines its cache to determine whether the object has been stored in its cache and is still up-to-date, for example, in forwarding the object in response to an earlier request. If so, the server on the local node satisfies the request for the data object out of its cache. If the object is not in the local node's local store or cache, then the server on the local node determines whether it is the owner of the object based on being closest to the mapped node ID space coordinate of the object among all the node IDs stored in node ID data 130, as described above. If the local node should be the owner, i.e., if the local node has the closest node ID to the mapped coordinate of the object, then a message is returned that the object does not exist. For example, if node 110b receives a request to retrieve the object described above with object ID (063177, 555853) before that object is stored at node 110b, then the distributed server on node 110b sends a response that includes data that indicates object ID (063177, 555853) does not exist. If the local node is not the owner, then an active node closer to the mapped node ID coordinate of the object is identified as described above. For example, the distributed system server at node 110a identifies node 110b as the node to store the object.

In step 370, the particular object is located at the closest node. For example, the request to store the particular object is forwarded to node 110b, and node 110b locates the object in object data 140 associated with object ID 150. In some embodiments, object data 140 is the distributed object itself. For example, the distributed system server on node 110b stores the particular object itself in object data 140. In some embodiments, the object data 140 is a specific pointer (such as a universal resource locator, URL) to a network resource where the object is obtained on the network. For example, the distributed system server on node 110b stores a URL for the particular object in object data 140.

In embodiments in which only the node IDs of less than all nodes are stored in node ID data 130, step 370 includes forwarding the request to the closest node of the stored node IDs and that closest node determines whether any of its stored node IDs are still closer to the particular object.

In the illustrated embodiment, step 370 includes steps 372, 374, 376. In step 372, it is determined whether the closest node is available. For example, node 110a determines whether node 110b is active on the LAN 102a based on the receipt of "Keep Alive" messages from node 110b on LAN 102a. If so, control passes to step 374 to operate on the particular object. For example, the request is forwarded to node 110b to process the request, and the server on node 110b follows the steps of method 300 starting at step 345.

However, if it is determined in step 372 that the closest node is not available, control passes to step 376. In step 376, a message is returned to the client requesting the object that the particular object is not available. For example, if node 110a determines that node 110b is not active on the LAN 102a based on the absence of recent "Keep Alive" messages from node 110b on LAN 102a, then the distributed server on node 110a sends to a client that requested the object a message with data that indicates the particular object is "Not Available."

In prior approaches, when the node with the closest node ID is not available, ownership of that node's objects is transferred to the node or nodes next closest to each object. In some embodiments that include steps 372, 374, 376, ownership is not transferred, but left with the unavailable node. In these embodiments, it is assumed that the unavailable node will soon rejoin the distributed system and the object will then become available. This is a good assumption for some networks, such as for enterprise networks in which a permanent removal of a node is indicated by an administratively directed removal. For example, if node 110b is not available, the ownership of the object with object ID (063177, 555853) is not transferred to node 110d, the node with the next closest node ID (see Table 2). Instead, it is assumed that node 110b will soon rejoin the distributed system 100 and requests involving the particular object with object ID (063177, 555853) will then be satisfied by the distributed system server on node 110b. This approach reduces flapping caused by congestion and noise.

3.0 Implementation Mechanisms—Hardware Overview

Figure 5:
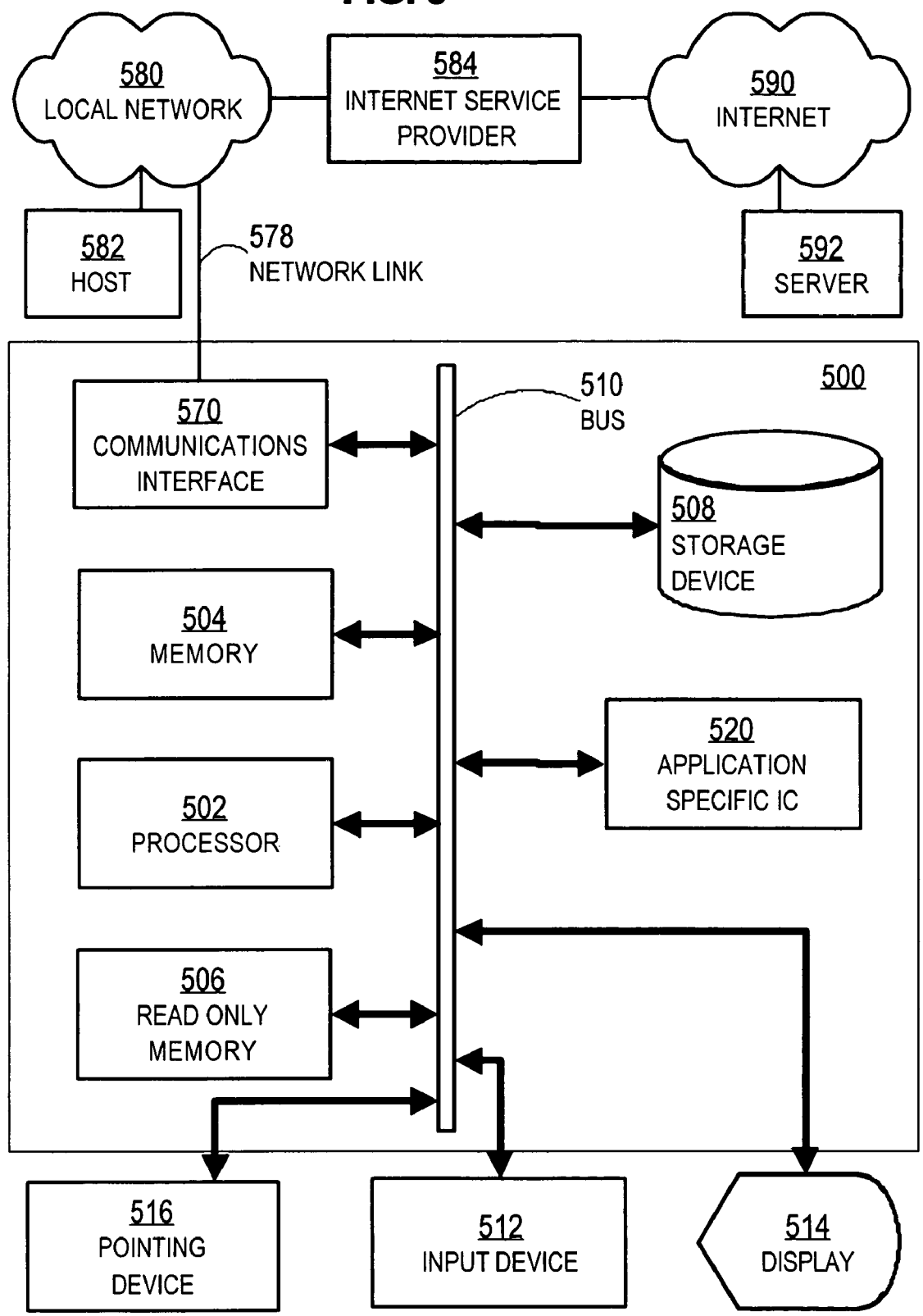
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, which carry information to and from computer system 500, are exemplary forms of carrier waves. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for locating an object on a node in a computer network, comprising the steps of:

receiving communication cost data that indicates a cost of physically transferring data among a plurality of nodes in a computer network;

determining a node identifier in a node identifier space for a node of the plurality of nodes based on the communication cost data such that a distance between two node identifiers for a pair of nodes of the plurality of nodes is based on a cost of physically transferring data between the pair of nodes, wherein a granularity of a coordinate in node identifier space is much finer than a separation between node identifiers for any two nodes;

for a particular object that has a particular object identifier, determining an object coordinate in node identifier space based on the particular object identifier and determining a closest node among the plurality of nodes based on the object coordinate and a plurality of different values for the coordinate for node identifiers corresponding to the plurality of nodes;

locating the particular object through the closest node;

wherein determining a particular node identifier further comprises:

receiving data that indicates that a particular node is directly connected to a neighbor set of one or more nodes;

determining whether the neighbor set includes more than one node, wherein if it is determined that the neighbor set includes more than one node, then determining a neighbor identifier interval between a largest node identifier of nodes in the neighbor set and a smallest node identifier of the nodes in the neighbor set for each dimension of a node identifier, and determining the particular node identifier for the particular node within the neighbor identifier interval; and for the particular node in the neighbor identifier interval:
determining a first random position in the neighbor identifier interval and a first measure of smoothness for a first set including a first random position and the neighbor set;
determining a second random position in the neighbor identifier interval and a second measure of smoothness for a second set including a second random position and the neighbor set;
determining whether the first measure of smoothness is more optimal than the second measure of smoothness; and
if it is determined that the first measure of smoothness is more optimal than the second measure of smoothness, then determining the particular node identifier is the first random position, wherein the measure of smoothness is a measure of how evenly a set of node identifiers is distributed within the neighbor identifier interval.

2. The method as recited in claim 1, said step of determining the node identifier further comprising the step of determining the node identifier that includes a plurality of dimensions.

3. The method as recited in claim 1, said step of determining the node identifier further comprising the steps of, if it is determined that the neighbor set includes only one node, then performing the steps of:
determining a neighbor identifier interval that includes a neighbor node identifier of the one node in the neighbor set for each dimension of a node identifier, and
determining the particular node identifier for the particular node in the neighbor identifier interval.

4. The method as recited in claim 1, said step of determining the particular node identifier for the particular node in the neighbor identifier interval further comprising the step of determining the particular node identifier as a first random position in the neighbor identifier interval.

5. The method as recited in claim 1, said step determining the closest node for a particular object that has a particular object identifier further comprising the steps of:
for each node identifier of the plurality of node identifiers, inputting the particular object identifier and the node identifier into a distance function that produces a distance between the node identifier and the object identifier;
determining a closest node identifier among the plurality of node identifiers which produces from the distance function a smallest distance to the object identifier; and
determining the closest node as a node that corresponds to the closest node identifier.

6. The method as recited in claim 1, further comprising the steps of:
receiving, from a generator node among the plurality of nodes, object data indicating a new distributed object without an object identifier, and
determining a user node set of one or more nodes of the plurality of nodes most likely to retrieve the new distributed object; and
assigning a new object identifier to the new distributed object based on a user identifier set of one or more node identifiers corresponding to the user node set.

7. The method as recited in claim 6, wherein:
said step of determining the user node set further comprises the step of including in the user node set the generator node, and said step of assigning the new object identifier further comprises the steps of determining a particular distance and determining the object identifier so that a distance between the object identifier and the user identifier set is no greater than the particular distance.

8. A computer-readable volatile or non-volatile medium, storing one or more sequences of instructions for locating an object on a node in a computer network, wherein execution of the one or more sequences of instructions by one or more processors causes the one or more processors to perform the steps of:
determining a node identifier comprising:
receiving data that indicates that a particular node is directly connected to a neighbor set of one or more nodes;
determining whether the neighbor set includes more than one node, wherein if it is determined that the neighbor set includes more than one node, then determining a neighbor identifier interval between a largest node identifier of nodes in the neighbor set and a smallest node identifier of the nodes in the neighbor set for each dimension of a node identifier, and determining a particular node identifier for the particular node within the neighbor identifier interval; and
for the particular node in the neighbor identifier interval:
determining a first random position in the neighbor identifier interval and a first measure of smoothness for a first set including a first random number and the neighbor set;
determining a second random number in the neighbor identifier interval and a second measure of smoothness for a second set including a second random number and the neighbor set;
determining whether the first measure of smoothness is more optimal than the second measure of smoothness; and
if it is determined that the first measure of smoothness is more optimal than the second measure of smoothness, then determining the particular node identifier is the first random number, wherein a measure of smoothness is a measure of how evenly a set of node identifiers is distributed within the neighbor identifier interval;
for a particular object that has a particular object identifier, determining an object coordinate in node identifier space based on the particular object identifier and determining a closest node among a plurality of nodes based on the object coordinate and a plurality of different values for the coordinate for the particular node identifiers corresponding to the plurality of nodes; and
locating the particular object through the closest node.

9. The computer-readable medium as recited in claim 8, further comprising:
receiving communication cost data that indicates a cost of physically transferring data among a plurality of nodes in a computer network;
determining the node identifier in a node identifier space for a node of the plurality of nodes based on the communication cost data such that a distance between two node identifiers for a pair of nodes of the plurality of nodes is based on a cost of physically transferring data between the pair of nodes, wherein a granularity of a coordinate in node identifier space is much finer than a separation between node identifiers for any two nodes.

10. An apparatus for locating an object on a node in a computer network, comprising:
processing means for determining a node identifier comprising:

receiving means for receiving data that indicates that a particular node is directly connected to a neighbor set of one or more nodes;

processing means for determining whether the neighbor set includes more than one node, wherein if it is determined that the neighbor set includes more than one node, then determining a neighbor identifier interval between a largest node identifier of nodes in the neighbor set and a smallest node identifier of the nodes in the neighbor set for each dimension of a node identifier, and determining a particular node identifier for the particular node within the neighbor identifier interval;

for the particular node in the neighbor identifier interval:

processing means for determining a first random number in the neighbor identifier interval and a first measure of smoothness for a first set including the first random number and the neighbor set;

processing means for determining a second random number in the neighbor identifier interval and a second measure of smoothness for a second set including the second random number and the neighbor set;

processing means for determining whether the first measure of smoothness is more optimal than the second measure of smoothness;

if it is determined that the first measure of smoothness is more optimal than the second measure of smoothness, then determining the particular node identifier is the first random number, wherein a measure of smoothness is a measure of how evenly a set of node identifiers is distributed within the neighbor identifier interval;

for a particular object that has a particular object identifier, processing means for determining an object coordinate in node identifier space based on the particular object identifier and determining a closest node among a plurality of nodes based on the object coordinate and a plurality of different values for the coordinate for the particular node identifiers corresponding to the plurality of nodes; and processing means for locating the particular object through the closest node.

11. An apparatus for locating an object on a node in a computer network, comprising:

a network interface that is coupled to a network for communicating therewith a data packet;

one or more processors;

a computer-readable volatile or non-volatile medium; and one or more sequences of instructions stored in the computer-readable medium, which, when executed by the one or more processors, causes the one or more processors to carry out the steps of:

receiving communication cost data that indicates a cost of physically transferring data among a plurality of nodes in a computer network;

determining a node identifier in a node identifier space for a node of the plurality of nodes based on the communication cost data such that a distance between two node identifiers for a pair of nodes of the plurality of nodes is based on a cost of physically transferring data between the pair of nodes, wherein a granularity of a coordinate in node identifier space is much finer than a separation between node identifiers for any two nodes;

for a particular object that has a particular object identifier, determining an object coordinate in node identifier space based on the particular object identifier and determining a closest node among the plurality of nodes based on the object coordinate and a plurality of different values for the coordinate for node identifiers corresponding to the plurality of nodes;

locating the particular object through the closest node;

wherein determining a particular node identifier further comprises:

receiving data that indicates that a particular node is directly connected to a neighbor set of one or more nodes;

determining whether the neighbor set includes more than one node, wherein if it is determined that the neighbor set includes more than one node, then determining a neighbor identifier interval between a largest node identifier of nodes in the neighbor set and a smallest node identifier of the nodes in the neighbor set for each dimension of a node identifier, and determining the particular node identifier for the particular node within the neighbor identifier interval; and for the particular node in the neighbor identifier interval:

determining a first random position in the neighbor identifier interval and a first measure of smoothness for a first set including a first random number and the neighbor set;

determining a second random position in the neighbor identifier interval and a second measure of smoothness for a second set including a second random number and the neighbor set;

determining whether the first measure of smoothness is more optimal than the second measure of smoothness; and if it is determined that the first measure of smoothness is more optimal than the second measure of smoothness, then determining the particular node identifier is the first random position, wherein a measure of smoothness is a measure of how evenly a set of node identifiers is distributed within the neighbor identifier interval.

12. The apparatus as recited in claim 11, said step of determining the node identifier further comprising the step of determining the node identifier that includes a plurality of dimensions.

13. The apparatus as recited in claim 11, said step of determining the node identifier further comprising the steps of, if it is determined that the neighbor set includes only one node, then performing the steps of:

determining a neighbor identifier interval that includes a neighbor node identifier of the one node in the neighbor set for each dimension of a node identifier, and determining the particular node identifier for the particular node in the neighbor identifier interval.

14. The apparatus as recited in claim 11, said step determining the closest node for a particular object that has a particular object identifier further comprising the steps of:

for each node identifier of the plurality of node identifiers, inputting the particular object identifier and the node identifier into a distance function that produces a distance between the node identifier and the object identifier;

determining a closest node identifier among the plurality of node identifiers which produces from the distance function a smallest distance to the object identifier; and determining the closest node as a node that corresponds to the closest node identifier.

15. The apparatus as recited in claim 11, wherein execution of the one or more sequences of instructions further causes the one or more processors to carry out the steps of:

receiving, from a generator node among the plurality of nodes, object data indicating a new distributed object without an object identifier, and determining a user node set of one or more nodes of the plurality of nodes most likely to retrieve the new distributed object; and assigning a new object identifier to the new distributed object based on a user identifier set of one or more node identifiers corresponding to the user node set.

16. The apparatus as recited in claim 15, wherein:

said step of determining the user node set further comprises the step of including in the user node set the generator node, and said step of assigning the new object identifier further comprises the steps of determining a particular distance and determining the object identifier so that a distance between the object identifier and the user identifier set is no greater than the particular distance.

17. An apparatus for locating an object on a node in a computer network, comprising:

a network interface that is coupled to a network for communicating therewith a data packet;

one or more processors;

a computer-readable volatile or non-volatile medium; and one or more sequences of instructions stored in the computer-readable medium, which, when executed by the one or more processors, causes the one or more processors to carry out the steps of:

determining a node identifier for a particular node, comprising:

receiving data that indicates that the particular node is directly connected to a neighbor set of one or more nodes;

determining whether the neighbor set includes more than one node, wherein if it is determined that the neighbor set includes more than one node, then determine a neighbor identifier interval between the nodes in the neighbor set and determine a particular node identifier for the particular node within the neighbor identifier interval;

determining a first random position in the neighbor identifier interval and a first measure of smoothness for a first set including a first random position and the neighbor set;

determining a second random position in the neighbor identifier interval and a second measure of smoothness for a second set including a second random position and the neighbor set;

determining whether the first measure of smoothness is more optimal than the second measure of smoothness; and if it is determined that the first measure of smoothness is more optimal than the second measure of smoothness, then determine the particular node identifier is the first random position, wherein a measure of smoothness is a measure of how evenly a set of node identifiers is distributed within the neighbor identifier interval;

for a particular object that has a particular object identifier, determining an object coordinate in node identifier space based on the particular object identifier and determine a closest node among a plurality of nodes based on the object coordinate and a plurality of different values for the coordinate for the particular node identifiers corresponding to the plurality of nodes; and locating the particular object through the closest node.

* * * * *